United States Patent [19]

Nishide et al.

[11] Patent Number: 5,851,505
[45] Date of Patent: Dec. 22, 1998

[54] METHOD OF PRODUCING PURIFIED AQUEOUS SOLUTION OF HYDROGEN PEROXIDE

[75] Inventors: Yoshiyuki Nishide; Yoshitsugu Minamikawa; Jun Kokubu, all of Yokkaichi, Japan

[73] Assignee: Mitsubishi Gas Chemical Company, Inc., Tokyo, Japan

[21] Appl. No.: 935,204

[22] Filed: Sep. 22, 1997

[30] Foreign Application Priority Data

Oct. 9, 1996 [JP] Japan ................................. 8-268852

[51] Int. Cl.⁶ .................................................. C01B 15/01
[52] U.S. Cl. ................................................... 423/584
[58] Field of Search ............................................. 423/584

[56] References Cited

U.S. PATENT DOCUMENTS

| | | | |
|---|---|---|---|
| 3,294,488 | 12/1966 | Dunlop et al. | 423/584 |
| 3,297,404 | 1/1967 | Elliott et al. | 423/584 |
| 3,556,727 | 1/1971 | Thirion | 423/584 |
| 4,792,403 | 12/1988 | Togo et al. | 423/584 |
| 4,999,179 | 3/1991 | Sugihara et al. | 423/584 |
| 5,055,286 | 10/1991 | Watanabe et al. | 423/584 |
| 5,268,160 | 12/1993 | Albal et al. | 423/584 |
| 5,456,898 | 10/1995 | Shimokawa et al. | 423/584 |

FOREIGN PATENT DOCUMENTS

| | | |
|---|---|---|
| 2624500-A1 | 6/1989 | France . |
| 4432451 A1 | 3/1995 | Germany . |
| 924624 | 2/1967 | United Kingdom . |
| 1197655 | 7/1970 | United Kingdom . |

OTHER PUBLICATIONS

Database WPI, Section Ch, Week 8806, Derwent Publications Ltd., London, GB; Class A13, AN 88–036860 XP002052098 & DD 249 703 A (Veb Chemiekomb Bitterfeld), Sep. 16, 1987.

*Primary Examiner*—Wayne Langel
*Attorney, Agent, or Firm*—Jones & Askew

[57] ABSTRACT

A purified aqueous solution of hydrogen peroxide is produced by contacting an aqueous solution of hydrogen peroxide containing organic impurities with a hydrophilic porous resin (the product under a tradename "WOFATIT EP63", etc.) having a specific surface area of not less than 800 m²/g to remove the organic impurities in the aqueous solution of hydrogen peroxide.

5 Claims, No Drawings

METHOD OF PRODUCING PURIFIED AQUEOUS SOLUTION OF HYDROGEN PEROXIDE

BACKGROUND OF THE INVENTION

The present invention relates to a method of purifying hydrogen peroxide by removing organic impurities contained in an aqueous solution of hydrogen peroxide.

At present, hydrogen peroxide is mostly produced by the anthraquinone method. Its procedure is generally as follows: An anthraquinone derivative such as 2-alkylanthraquinone is hydrogenated in a water-insoluble solvent in the presence of a hydrogenation catalyst to convert the derivative into corresponding anthrahydroquinone. After removing the catalyst, the resulting product is oxidized by air to give hydrogen peroxide with starting 2-alkylanthraquinone being regenerated. Then, the oxidized product is extracted with water to obtain an aqueous solution containing hydrogen peroxide. The hydrogen peroxide-containing aqueous solution resulting from the step of extraction with water is contaminated with organic impurities composed of anthraquinones, solvents and decomposed materials derived from these substances. Such aqueous hydrogen peroxide solutions having a practically usable concentration of 5 to 70 wt % usually contain 20 to several hundred mg/liter of organic impurities in terms of the total organic carbon content. These aqueous hydrogen peroxide solutions are further purified to achieve desired quality.

An aqueous solution of hydrogen peroxide has been widely used in the field of bleaching and chemically polishing solutions for mainly paper and pulp so far. Recently, its use in the field of electronic industry as washing solutions for silicon wafers and semiconductors has been increasing. Since high purity is required as devices are highly integrated, there has been a demand for high purity quality of such a solution in which the content of total impurities including known organic impurities and metallic components such as Al, Fe, or Cr are minimized as much as possible.

A known method of removing such organic impurities contained in an aqueous hydrogen peroxide solution comprises treating hydrogen peroxide containing organic impurities at 40° C. or lower with a resin having a network molecular structure and containing no ion exchange group which is obtained by polymerizing styrene and crosslinking it with divinylbenzene (see Japanese Patent Publication No. 46-26095 and French Patent No. 3,294,488).

Japanese Patent Application Laid-open No. 63-156004 (U.S. Pat. No. 4,792,403) describes a method of removing organic impurities in an aqueous hydrogen peroxide solution by using a halogen-containing porous resin.

However, there are various problems in the case of removing organic impurities from an aqueous hydrogen peroxide solution using an adsorbent resin conventionally used.

First, since the conventional molecular adsorbent resins produced by polymerization of styrene and crosslinking with divinylbenzene, and halogen-containing porous resins have hydrophobic particle surface, separation and floating of these resins give when they are brought into contact directly with water or an aqueous hydrogen peroxide solution. Therefore, the resins have to be treated with a polar solvent such as alcohol or acetone in order to confer an affinity for a solution to be contacted. Further, even when a hydrogen peroxide solution is passed through a column packed with the conventionally used resin which has been treated with alcohol or acetone in advance, a part of resin loses an affinity for the aqueous solution, which causes a problem that organic impurity-removing efficiency is remarkably decreased.

On the other hand, in the case of acryl ester polymers used as a hydrophilic porous resin having no ion exchange group, their specific surface area is structurally much smaller than that of the above-described adsorbent resins. Thus, the resins are disadvantageous in that a large amount of the resins is required to remove organic impurities in an aqueous solution of hydrogen peroxide.

An object of the present invention is to solve the problems in the prior art technique, and to provide a novel method of removing impurities in an aqueous solution of hydrogen peroxide.

Another object of the present invention is to provide a method of removing organic impurities in an aqueous solution of hydrogen peroxide with a high removing efficiency and simple operation without requiring a pretreatment to make the resin hydrophilic.

SUMMARY OF THE INVENTION

As a result of an intensive study of a method of producing a highly purified aqueous solution of hydrogen peroxide by removing organic impurities in the aqueous hydrogen peroxide solution, the present inventors have found that organic impurities can be efficiently removed from an aqueous solution of hydrogen peroxide by contacting an aqueous solution containing organic impurities with a hydrophilic porous resin having a specific surface area of not less than 800 $m^2/g$ without a treatment of the resin with alcohol for achieving hydrophilicity. Thus, the present invention has been completed.

The present invention relates to a method of producing a purified aqueous solution of hydrogen peroxide which comprises the step of contacting an aqueous solution of hydrogen peroxide containing organic impurities with a hydrophilic porous resin having a specific surface area of not less than 800 $m^2/g$ to remove the organic impurities in the aqueous solution of hydrogen peroxide.

DETAILED DESCRIPTION OF THE INVENTION

The porous resins used in this invention are hydrophilic ones having continuous pores. The degree of porosity corresponds to a specific surface area, measured by the BET method ($N_2$), of not less than 800 $m^2/g$, preferably 1,000 to 1,500 $m^2/g$. The organic impurity-removing efficiency is remarkably increased when a specific surface area is not less than 800 $m^2/g$.

Further, the use of an originally hydrophilic resin does not require a treatment with alcohol for achieving hydrophilicity and makes it possible to remove organic impurities simply without a pretreatment. Resins having no hydrophilicity repulse or shed water and cannot exhibit their function.

Hydrophilic adsorbent resins having no ion exchange group are preferably used. They have a water content of 35 to 40%, an apparent density of 1 to 1.3 g/liter, and an average pore diameter of 10 to 200 Å.

Examples of the hydrophilic porous resins having such characteristics include those having organic groups selected from the group consisting of hydroxyl groups (—OH), chloroalkyl groups, and hydroxyalkyl groups. The content of these organic groups ranges preferably from 1 to 40 wt %, more preferably from 5 to 20 wt %, based on the total weight of the resin.

More specifically, the resins which can be preferably used are crosslinked polymers of aromatic monovinyl monomers and aromatic polyvinyl monomers into which hydroxyl, chloroalkyl, or hydroxyalkyl groups have been introduced.

The chloroalkyl group and the hydroxyalkyl group as used herein are generally represented by $-(CH_2)_nCl$ and $-(CH_2)_nOH$, respectively. Since these groups become less hydrophilic as the straight chain portion becomes longer, n is preferably from 1 to 5.

Styrene and vinyltoluene, for example, are suitably used as the aromatic monovinyl monomers. Examples of the aromatic polyvinyl monomers include divinylbenzene and trivinylbenzene.

The resins which can be more preferably used are those selected from the group consisting of styrene/divinylbenzene copolymer, styrene/trivinylbenzene copolymer, and vinyltoluene/divinylbenzene copolymer, into which organic groups selected from the group consisting of hydroxyl groups, chloroalkyl groups, and hydroxyalkyl groups have been introduced.

A method of introducing hydroxyl groups into the above-described copolymers comprises, for example, reacting the copolymers with molecular halogen, such as chlorine or bromine, in the presence of a catalyst, such as ferric chloride or boron fluoride, to halogenate the copolymers, and hydrolyzing the resulting copolymers by boiling them in water together with sodium hydroxide and the like.

Introduction of chloroalkyl groups into the above copolymers can be carried out by, for example, reacting the copolymers with chloroalkyl ether in the presence of a catalyst such as aluminum chloride or tin tetrachloride to chloroalkylate the copolymers.

Also, hydroxyalkyl groups can be introduced into the copolymers by boiling the chloroalkylated copolymers as obtained above in water together with sodium hydroxide and the like to hydrolyze the copolymers.

The hydrophilic porous resins used in the present invention can be efficiently used in the form of particles having an average particle diameter of 0.3 to 1.2 mm. The average particle diameter as used herein means the size of openings of a sieve which permits 10 wt % of the entire resin to pass through the openings and 90 wt % of the resin to be left on the sieve.

As the hydrophilic porous resins according to the present invention, hydroxyalkylated styrene/divinylbenzene copolymers are particularly preferred.

These resins are also commercially available. For example, the product under a tradename "WOFATIT EP63" (Bayer) is a hydrophilic hydroxyalkylated styrene/divinylbenzene copolymer having a specific surface area of not less than 1,000 $m^2$/g, an average pore diameter of about 100 Å, a water content of 35 to 45%, and an apparent density of 700 to 800 g/liter. Further, the average particle diameter of the resin ranges from 0.3 to 1.2 mm.

WOFATIT EP63 contains macropores of styrene/divinylbenzene copolymer and numerous micropores which provides excellent adsorbability. Therefore, it can adsorb most of substances which can be adsorbed by hydrophobic adsorbent resins and polar substances and semihydrophilic organic substances.

Such a hydrophilic porous resin itself is known for use in the treatment of waste water in the chemical industry (Studies in Surface Science and Catalysis, Vol. 87, p173–178, 1994, Elsevier Science B.V., DD249, 703, etc.) However, its use in purification of an aqueous solution of hydrogen peroxide has not been known. The present invention has been completed based on the finding that the molecular adsorbent resin having such specific properties is highly effective for removing organic impurities in an aqueous hydrogen peroxide solution.

Aqueous solutions of hydrogen peroxide containing organic impurities to be treated in the present invention may be produced by any method such as the anthraquinone method or the direct synthesis method in which hydrogen and oxygen are directly reacted.

As described above, hydrogen peroxide is mostly produced by the anthraquinone method at present. The hydrogen peroxide solution produced by this method is further purified depending on demands. However, the solution contains impurities such as organic substances or metals, which requires further purification operations. Therefore, the method of the present invention is particularly effective for treating the aqueous solution of hydrogen peroxide produced by the anthraquinone method.

Examples of such aqueous hydrogen peroxide solutions include those having a hydrogen peroxide concentration of, for example, 5 to 70 wt %, more preferably 10 to 70 wt %.

The method of the present invention can be effectively applied to the aqueous solution of hydrogen peroxide containing organic impurities in a concentration of not more than 500 mg/liter in terms of the total organic carbon content. If the concentration of organic impurities exceeds 500 mg/liter, there is a possibility that the removing efficiency is decreased, which makes it difficult to effect the treatment in a practical scale.

Examples of organic impurities contained in an aqueous solution of hydrogen peroxide which can be removed by the method of the present invention include polar substances such as alcohols, phenols or carboxylic acids.

In the present invention, the aqueous hydrogen peroxide solution containing organic impurities can be contacted with the hydrophilic porous resin by either a column method or a batch-wise method.

The column method is carried out by, for example, continuously applying the aqueous hydrogen peroxide solution containing organic impurities to the hydrophilic porous resin packed in a column. In the case of the batch-wise method, the hydrophilic porous resin and the aqueous hydrogen peroxide solution containing organic impurities are mixed and stirred for a predetermined period of time and, after separating the resin, the purified hydrogen peroxide solution can be isolated. Since the column method using a column packed with the resin enables efficient production of hydrogen peroxide with high purity, this method is practical and preferred in an industrial scale. In the column method, the aqueous hydrogen peroxide solution is preferably passed through the resin layer at a linear velocity (LV) within the range from 1 to 500 m/hr, at a space velocity (SV) within the range from 1 to 100 /hr.

The purified aqueous solution of hydrogen peroxide obtained by the method of the present invention has high purity and its content of organic impurities is remarkably reduced. Although it depends on the concentration of organic impurities before purification, the method of the present invention can achieve such high purity that the concentration of organic impurities in the purified aqueous solution of hydrogen peroxide is reduced to 50 to several mg/liter or less.

When the removing capacity of the porous resin is lowered after contacting with the aqueous hydrogen peroxide solution, the resin can be regenerated by the treatment with water, an alkaline or acidic solution, alcohol, a warm water, or steam.

According to the present invention, organic impurities can be efficiently removed from an aqueous hydrogen peroxide solution containing such impurities by contacting the hydrogen peroxide solution with the hydrophilic porous resin without a pretreatment with alcohol and the like to obtain a highly purified aqueous solution of hydrogen peroxide which can be used in the field of electronic industry.

EXAMPLES

The following Examples illustrate the present invention in detail, but are not construed to limit the scope of the invention.

In the present invention, the total organic carbon content in the aqueous hydrogen peroxide solution was measured by using a total organic carbon analyzer (Shimadzu Corporation: TOC-5000).

Example 1

20 ml of WOFATIT EP63 which is hydrophilic and has a specific surface area of not less than 1,000 $m^2/g$ (a hydrophilic adsorbent resin having no ion exchange group, styrene/divinylbenzene crosslinked copolymer, manufactured by Bayer) was packed in a column having an inside diameter of 16 mm and a length of 30 cm, and washed with ultra pure water at a space velocity of 8 $hr^{-1}$ for 1 hour. As a result, the resin had an affinity for water and no separation and floating was observed. Subsequently, a 31 wt % aqueous solution of crude hydrogen peroxide (containing 40 mg/liter of organic impurities in terms of the total organic carbon content) was passed through the column at a space velocity of 8 $hr^{-1}$ for 24 hours. After 1 hour, sampling was started to analyze the total organic carbon content in the aqueous hydrogen peroxide solution passed through the column. In the resulting purified aqueous solution of hydrogen peroxide, the total organic carbon content was reduced to 12 mg/liter. During passing the solution, any problem such as floating of the resin packed or separation of the resin and the solution was not observed at all.

Example 2

The same treatment as in Example 1 was carried out except for using a 60 wt % aqueous solution of crude hydrogen peroxide (containing 20 mg/liter of organic impurities in terms of the total organic carbon content).

One hour after the commencement of passing of the solution, sampling was carried out from the outlet of the column to analyze the total organic carbon content in the aqueous hydrogen peroxide solution passed through the column. The total organic carbon content was reduced to 6 mg/liter.

Comparative Example 1

The same treatment as in Example 1 was carried out except for using DIAION SP-207 (Mitsubishi Chemical Corporation) as the hydrophobic porous adsorbent resin.

When the resin was packed in the column, a considerable amount of the resin did not have an affinity for water and resulted in separation and floating. One hour after the commencement of passing of the solution, sampling was carried out from the outlet of the column to analyze the total organic carbon content in the aqueous hydrogen peroxide solution passed through the column. As a result, the total organic carbon content was 35 mg/liter, which meant that organic impurities were hardly removed. During passing the solution, the resin was floated and separated from the solution.

Comparative Example 2

The same treatment as in Example 1 was carried out except that DIAION SP-207 (Mitsubishi Chemical Corporation) was used as the hydrophobic porous adsorbent resin and the resin was pretreated by passing methanol kept at 60° C. through the column at a space velocity of 8 $hr^{-1}$ for 2 hours to develop an affinity for water.

One hour after the commencement of passing of the solution, sampling was carried out from the outlet of the column to analyze the total organic carbon content in the aqueous hydrogen peroxide solution passed through the column. As a result, the total organic carbon content was reduced to 12 mg/liter, but a part of the resin packed was floated during passing the solution and lost an affinity for water.

Comparative Example 3

The same treatment as in Example 1 was carried out except that AMBERLITE XAD-8 (acryl ester copolymer, Rohm & Haas, specific surface area of 120 to 200 $m^2/g$) was used as the hydrophilic porous adsorbent resin and the resin was pretreated by passing methanol kept at 60° C. through the column at a space velocity of 8 $hr^{-1}$ for 2 hours.

One hour after the commencement of passing of the solution, sampling was carried out from the outlet of the column to analyze the total organic carbon content in the aqueous hydrogen peroxide solution passed through the column. The total organic carbon content was reduced to 25 mg/liter, but the resin could not compete in the removing efficiency with the hydrophilic porous resin of the present invention.

What is claimed is:

1. A method of producing a purified aqueous solution of hydrogen peroxide which comprises the step of contacting an aqueous solution of hydrogen peroxide containing organic impurities with a hydrophilic porous resin having a specific surface area of not less than 800 $m^2/g$ to remove the organic impurities in the aqueous solution of hydrogen peroxide, said hydrophilic porous resin being an adsorbent resin having no ion exchange group and containing 1 to 40 wt % of organic groups selected from the group consisting of hydroxyl groups, chloroalkyl groups, and hydroxyalkyl groups.

2. The method according to claim 1, wherein said hydrophilic porous resin is at least one selected from the group consisting of styrene/divinylbenzene copolymer, styrene/trivinylbenzene copolymer, and vinyltoluene/divinylbenzene copolymer, into which organic groups selected from the group consisting of hydroxyl groups, chloroalkyl groups, and hydroxyalkyl groups have been introduced.

3. The method according to claim 2, wherein said hydrophilic porous resin is a hydroxyalkylated styrene/divinylbenzene copolymer.

4. The method according to claim 1, wherein the aqueous solution of hydrogen peroxide containing organic impurities has a hydrogen peroxide concentration of 5 to 70 wt %.

5. The method according to claim 1, wherein the aqueous solution of hydrogen peroxide containing organic impurities contains not more than 500 mg/liter of the organic impurities in terms of the total organic carbon content.

* * * * *

US005851505C1

(12) EX PARTE REEXAMINATION CERTIFICATE (5163rd)
United States Patent
Nishide et al.

(10) Number: US 5,851,505 C1
(45) Certificate Issued: Jul. 26, 2005

(54) METHOD OF PRODUCING PURIFIED AQUEOUS SOLUTION OF HYDROGEN PEROXIDE

(75) Inventors: Yoshiyuki Nishide, Yokkaichi (JP); Yoshitsugu Minamikawa, Yokkaichi (JP); Jun Kokubu, Yokkaichi (JP)

(73) Assignee: Mitsubishi Gas Chemical Company, Inc., Tokyo (JP)

Reexamination Request:
No. 90/005,734, May 22, 2000

Reexamination Certificate for:
Patent No.: 5,851,505
Issued: Dec. 22, 1998
Appl. No.: 08/935,204
Filed: Sep. 22, 1997

(30) Foreign Application Priority Data

Oct. 9, 1996 (JP) .............................................. 8-268852

(51) Int. Cl.⁷ .............................................. C01B 15/01
(52) U.S. Cl. ...................................................... 423/584
(58) Field of Search ......................................... 423/584

(56) References Cited

U.S. PATENT DOCUMENTS

| | | | |
|---|---|---|---|
| 3,294,488 A | 12/1966 | Dunlop et al. | 423/584 |
| 3,297,404 A | 1/1967 | Elliot et al. | 423/584 |
| 3,556,727 A | 1/1971 | Thirion | 423/584 |
| 4,792,403 A | 12/1988 | Togo et al. | 423/584 |
| 4,999,179 A | 3/1991 | Sugihara et al. | 423/584 |
| 5,055,286 A | 10/1991 | Watanabe et al. | 423/584 |
| 5,268,160 A | 12/1993 | Albal et al. | 423/584 |
| 5,456,898 A | 10/1995 | Shimokawa et al. | 423/584 |

FOREIGN PATENT DOCUMENTS

| | | |
|---|---|---|
| DD | 249703 A | 9/1987 |
| DE | 4432451 A-1 | 3/1995 |
| FR | 2624500 A-1 | 6/1989 |
| GB | 924624 | 4/1963 |
| GB | 1197655 | 7/1970 |

OTHER PUBLICATIONS

Data base WPI, Section Ch. Week 8806, Derwent Publications Ltd., London, GB; Class A 13, AN 88–036860 XP 002052098 & DD 249703 A (Veb Chemiekomb Bitterfeld). Sep. 16, 1987.
*Handbook of Adsorption Technology*, pp. B4, 200–204 (Feb. 2, 1993. Japan). (With Certified Translation).
*WOFATIT® Ion–exchange resins on new route*, pp. 1–23, VEB Chemickombinat Bitterfeld.
*Provisional Data Sheet WOFATIT EP 63*, Chemie AG, Bitterfeld–Wolfen, Germany, 1994, 3 pages.
Radeke et al., *Studies in Surface Science and Catalysts*, vol. 87, pp. 173–178 (1994).
*WOFATIT® ION EXCHANGERS* Cchemie AG, Bitterfeld-–Wolfen, Germany, 1993).

*Primary Examiner*—Wayne A. Langel

(57) ABSTRACT

A purified aqueous solution of hydrogen peroxide is produced by contacting an aqueous solution of hydrogen peroxide containing organic impurities with a hydrophilic porous resin (the product under a tradename "WOFATIT EP63", etc.) having a specific surface area of not less than 800 m²/g to remove the organic impurities in the aqueous solution of hydrogen peroxide.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–5 is confirmed.

* * * * *